United States Patent [19]

Yamaguchi

[11] Patent Number: 4,594,909
[45] Date of Patent: Jun. 17, 1986

[54] TILTABLE STEERING MECHANISM

[75] Inventor: Mikio Yamaguchi, Takasaki, Japan

[73] Assignee: Nippon Seiko Kabushiki Kaisha, Tokyo, Japan

[21] Appl. No.: 650,618

[22] Filed: Sep. 14, 1984

[30] Foreign Application Priority Data

Mar. 7, 1984 [JP] Japan .............................. 59-31648[U]

[51] Int. Cl.⁴ .............................................. B62D 1/18
[52] U.S. Cl. ........................................ 74/493; 74/540; 74/541; 280/775
[58] Field of Search .................. 74/493, 534, 535, 540, 74/541; 280/775

[56] References Cited

U.S. PATENT DOCUMENTS

| 3,199,625 | 8/1965 | Liebreich | 74/493 X |
| 4,102,218 | 7/1978 | Naka et al. | 74/540 X |
| 4,470,322 | 9/1984 | Beauch | 74/493 |

FOREIGN PATENT DOCUMENTS 1018485 1/1966 United Kingdom .................. 74/493

Primary Examiner—Allan D. Herrmann
Attorney, Agent, or Firm—Wyatt, Gerber, Shoup, Scobey and Badie

[57] ABSTRACT

In a tiltable steering mechanism wherein a support portion for rotatably supporting a steering shaft on which a steering wheel is mounted is provided for tilting about a tilt axis relative to a fixed portion fixed to a vehicle body, the tilt axis is defined by a pair of tilt fulcrum forming members and an engaging portion is provided in one of the support portion and the fixed portion positioned at the intermediate portion between the two tilt fulcrums, and a restraining member for engaging the engaging portion to fix the support portion to the fixed portion at a desired tilt angle is movably provided in the other of the support portion and the fixed portion. Accordingly, the support portion is fixed to the fixed portion with a great steering wheel holding force and high steering wheel supporting rigidity.

19 Claims, 11 Drawing Figures

TILTABLE STEERING MECHANISM

BACKGROUND OF THE INVENTION

1. Field of the Invention

This invention relates to a tiltable steering mechanism which can adjust the mounting angle of a steering wheel.

2. Description of the Prior Art

Tiltable steering mechanisms are known in which a support portion for rotatably supporting a steering shaft on which a steering wheel is mounted is made tiltable about a tilt axis relative to a fixed portion fixed to a vehicle body and is placed in a fixed state at a selected tilt angle by a tightening system or a ratchet system. However, these mechanisms suffer from the following disadvantages.

In the tightening system, if the tightening force is small, the set tilt position of the steering wheel is liable to move and in respect of operation, this system lacks in the sense of high class.

In the ratchet system wherein the support portion is fixed by the mesh engagement of the ratchet portion, the holding of the steering wheel relative to the tilt setting is reliable, but the locking of the support portion and the fixed portion is effected only on one side surface of a bracket, and this leads to a disadvantage that the steering wheel load is not retained on the opposite side surface and the steering wheel rigidity is low.

SUMMARY OF THE INVENTION

It is therefore an object of the present invention to overcome the above-noted disadvantages and to provide a tiltable steering mechanism which adopts an engaging system such as a ratchet or gear system instead of the tightening system to ensure the holding of the steering wheel and bring the engaged position to a position different from that in the conventional mechanisms, thereby enhancing the rigidity of the steering wheel.

The above object of the present invention is achieved by providing an engaging portion not on the side surface of a bracket or the like but at a location in the intermediate portion in the tilt axis direction of one of the support portion and the fixed portion, that is, the intermediate portion between two tilt fulcrums defining the tilt axis, and movably providing on the other of the support portion and the fixed portion a restraining member for engaging the engaging portion to fix the support portion to the fixed portion.

DETAILED DESCRIPTION OF THE PREFERRED EMBODIMENTS

Figure 1:
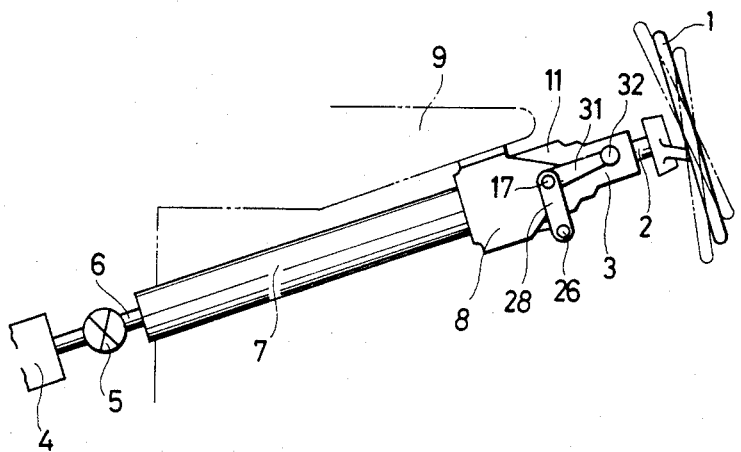
FIG. 1 shows a first embodiment of the present invention.

Referring to FIG. 1 which is a side view showing a first embodiment of the present invention as mounted on a vehicle, an upper steering shaft 2 on which a steering wheel 1 is mounted is rotatably supported on an upper column 3 which is a supporting portion, and a lower steering shaft 6 connected to a steering gear 14 through a universal joint 5 is rotatably supported on a lower column 7. The lower column 7 is fixedly mounted on the instrument panel 9 of the vehicle by a bracket 8 which is a fixed portion fixed to the upper portion of the lower column 7. The upper steering shaft 2 and the lower steering shaft 6 are tiltably connected together by a universal joint 10 partly shown in FIG. 2.

The lower portion of the upper column 3 provides a cylindrical portion 11 which is connected to the bracket 8 in a manner to be described.

Figure 2:
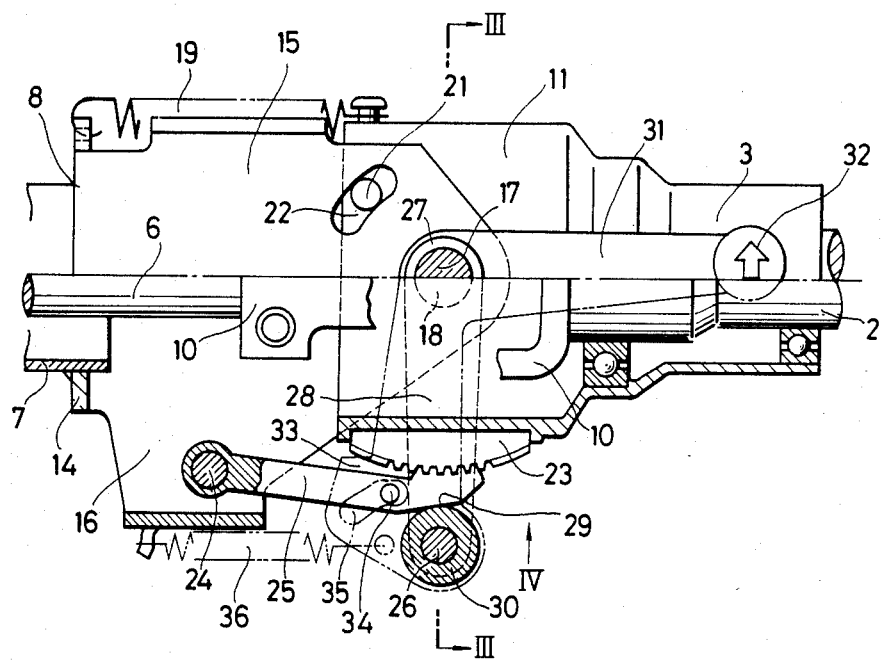
FIG. 2 is a side view partly in cross-section of the essential portions of the first embodiment.
Figure 3:
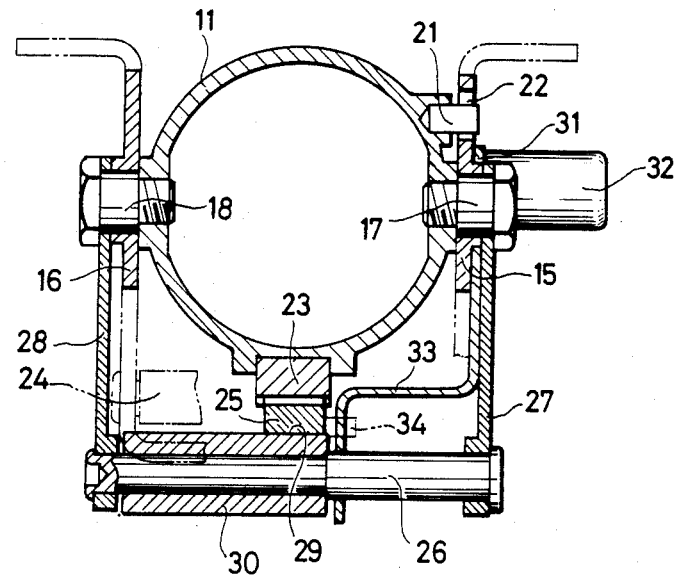
FIG. 3 is a cross-sectional view taken along line III—III of FIG. 2.

Referring to FIG. 2 which is an enlarged side view partly in cross-section of the essential portions of FIG. 1, the bracket 8 has a left bent portion 15 and a right bent portion 16 extending parallel to each other from the opposite sides of a base 14, and the cylindrical portion 11 of the upper column 3 extends into between the two bent portions 15 and 16 so as to contact them (see FIG. 3 which is a cross-sectional view taken along line III—III of FIG. 2). The cylindrical portion 11 is connected to the bracket 8 by a pair of tilt pins 17 and 18 defining the tilt axis perpendicular to the left and right bent portions at the contact portion and passing through the center of the universal joint 10 and is tiltable about this tilt axis.

Figure 4:
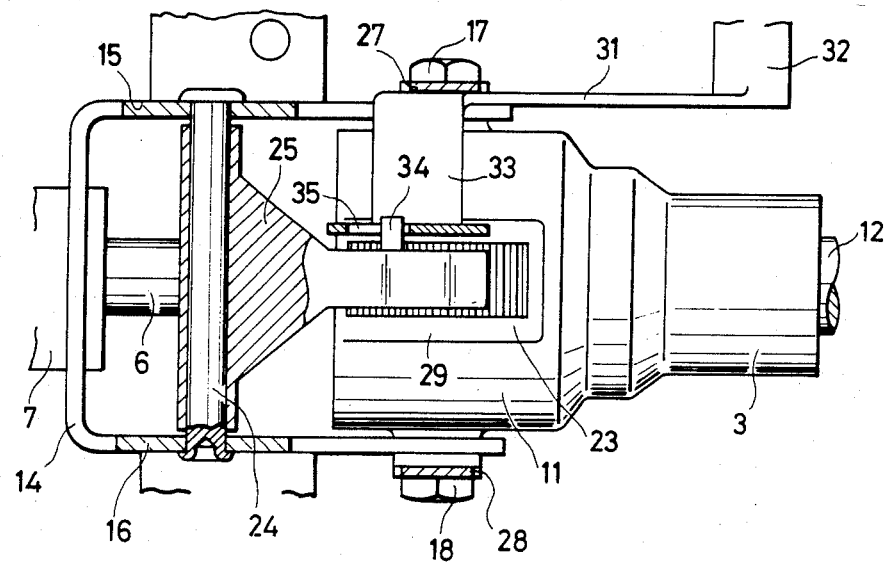
FIG. 4 is a view taken along arrow VI of FIG. 2.
Figure 5:
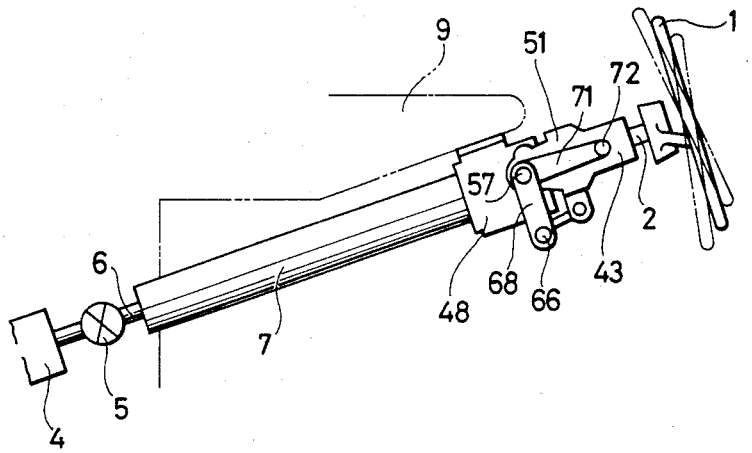
FIG. 5 shows a second embodiment of the present invention.

A jumping-up spring 19 is extended between the bracket 8 and the cylindrical portion 11 and biases the upper column 3 in the direction of upward tilting. A stopper pin 21 is studded in the cylindrical portion 11 and fits in a stroke controlling slot 22 formed in the left bent portion 15, whereby the range of tilting of the upper column 3 is controlled. A gear portion 23 which is an engaging portion is fixed to the lower part of the cylindrical portion 11 which corresponds to the lower part of the intermediate portion between the two tilt pins 17 and 18, and a movable gear member 25 which is a restraining member having at the overhanging tip end thereof teeth engageable with the teeth of the gear portion 23 is pivotably supported on a support shaft 24 fixedly mounted between the two bent portions 15 and 16 of the other bracket 8 (see FIG. 4 which is a view taken along arrow IV of FIG. 2). The gear portion 23 comprises a number of teeth formed on a convex surface centered at the tilt pins 17 and 18.

A pair of support hangers 27 and 28 are mounted outside the bracket 8 for pivotal movement about the tilt pins 17 and 18, and the lower ends thereof are connected to each other by a roller supporting shaft 26. A roller 30 is rotatably fitted on the roller supporting shaft 26 so as to be able to contact the tapered back surface portion 29 of the movable gear member 25. The roller supporting shaft 26, the supporting hangers 27, 28 and the roller 30 together constitute holding means.

Between the left bent portion 15 and the hanger 27, a tilt lever 31 which is an operating member is supported and pivotably mounted on a tilt pin 17. The tilt lever 31 has an arm on which a knob 32 is mounted and another arm 33 downwardly extending and coupled to the roller supporting shaft 26. A guide hole 35 in which is fitted a guide pin 34 extending from the movable gear member 25 is formed in the lower portion of the arm 33, and one end of a roller pre-pressure spring 36 having the other end thereof attached to the bracket 8 is secured to the lower portion of the arm 33. The roller supporting shaft 26 and the support hangers 27 and 28 may be fixed to the other end of the pre-pressure spring 36.

The roller pre-pressure spring 36 biases the tilt lever 31 in the rightward direction as viewed in FIG. 2 so as to urge the roller 30 against the tapered back surface portion 29 of the movable gear member 25. Also, the arm 33 and the roller supporting shaft 26 are coupled together and the guide pin 34 is fitted in the guide hole 35, whereby when the tilt lever 31 is turned leftwardly against the force of the spring 36, the roller 30 separates from the tapered back surface portion 29 and at the same time, the movable gear 25 is forced to be disengaged from the gear portion 23.

Operation of the first embodiment having the above-described construction will now be described.

When it is desired to adjust the position of the steering wheel to a desired tilt angle from the state as shown in FIG. 2 wherein the upper column 3 is fixed to the bracket 8, the knob 32 is grasped by the hand and the tilt lever 31 is rotated in the direction of arrow. Thereupon, the arm 33 is turned leftwardly and the roller 30 becomes disengaged from the tapered portion 29 of the movable gear member 25 and, as described above, the guide pin 34 is guided in the guide hole 35 and the movable gear member 25 is turned rightwardly about the support shaft 24 and becomes disengaged from the fixed gear portion 23. If, at this time, the steering wheel 1 is grasped by the hands, the steering wheel 1 may be moved to a desired tilt position, whereupon the hand may be released from the tilt lever 31, whereby the tilt lever 31 and the movable gear member 25 are interlocked by the force of the pre-pressure spring 36 and rotate in the opposite direction, so that the movable gear member 25 again comes into mesh engagement with the fixed gear portion 23 at another position and the upper column 3 is firmly fixed to the bracket 8. That is, the roller 30 pushes the tapered back surface portion 29 while the tilt lever 31 is turned rightwardly by the force of the spring 36, thereby bringing the movable gear member 25 into mesh engagement with the fixed gear portion 23.

When the steering wheel 1 is not grasped by the hands, the upper column 3, namely, the steering wheel 1, jumps up to a jump-up position (indicated by dots-and-dash line in FIG. 1) by the force of the jumping-up spring 19. When the tilt lever 31 is then released, the steering wheel 1 becomes fixed at the jump-up position and in this case, getting on and off the vehicle can conveniently be effected while holding to the steering wheel 1. Adjustment of the steering wheel from the jump-up position to a driving position of a desired tilt angle may be effected as previously described by operating the tilt lever 31.

In the first embodiment, the gear meshing portion is positioned below the intermediate portion between the left and right tilt pins 17 and 18 and therefore, the two tilt pins 17 and 18 are equally subjected to a force and their steering wheel support rigidity is enhanced. That is, the steering wheel does not vibrate during the idle vibration or highspeed running and provides a sense of rigidity.

Also, if the entire upper column 3 including not only the upper portion thereof but also the lower cylindrical portion 11 is made into a cylindrical shape as shown in FIG. 2, high rigidity, compactness and light weight can be realized as compared with the conventional device in which a bracket with left and right side plates is secured to the upper column. Further, the lengthwise dimension can be reduced and the range of tilt can be secured widely.

Description will now be made of a second embodiment of the present invention shown in FIGS. 5 to 8.

The difference of the second embodiment from the first embodiment is that a fixed gear portion 63 is provided on the side of a fixed bracket 48 and a movable gear member 65 is provided on the side of an upper column 43. In the other points of the construction, there are only some changes of design, and the operation of the second embodiment is substantially the same as that of the first embodiment. Accordingly, in the second embodiment, members substantially similar to those of the first embodiment are given similar reference numerals and members corresponding to those of the first embodiment are given reference numerals having 40 added to the reference numerals in the first embodiment.

Figure 6:
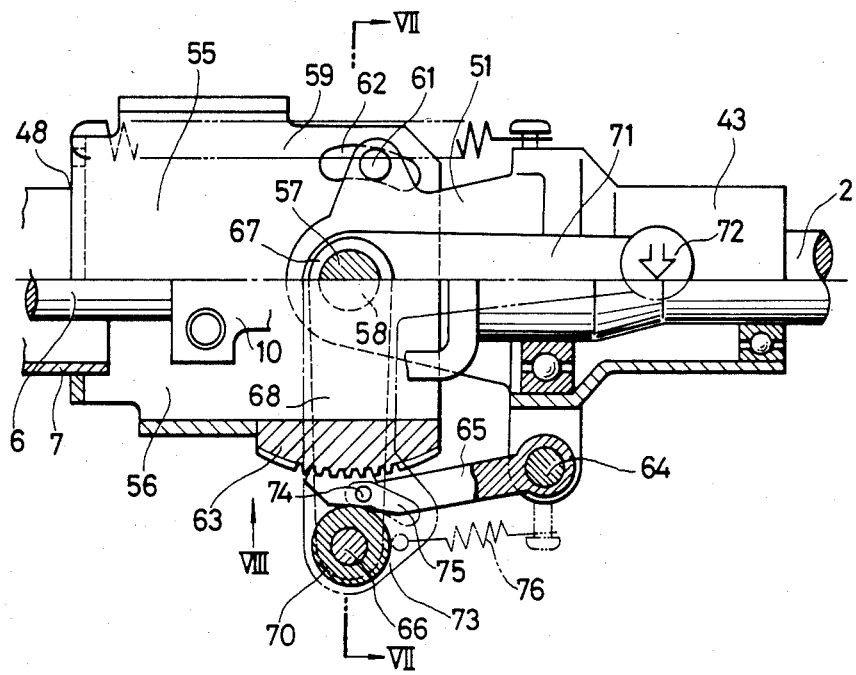
FIG. 6 is a side view partly in cross-section of the essential portions of the second embodiment.
Figure 7:
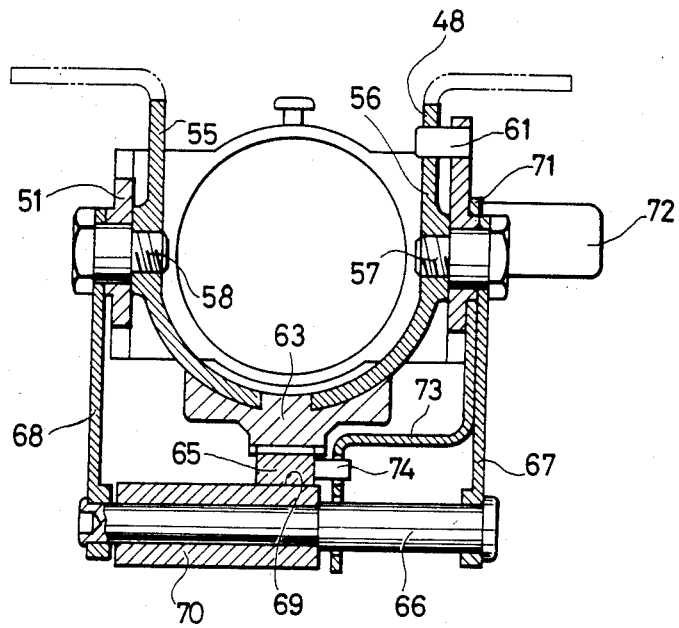
FIG. 7 is a cross-sectional view taken along line VII—VII of FIG. 2.
Figure 8:
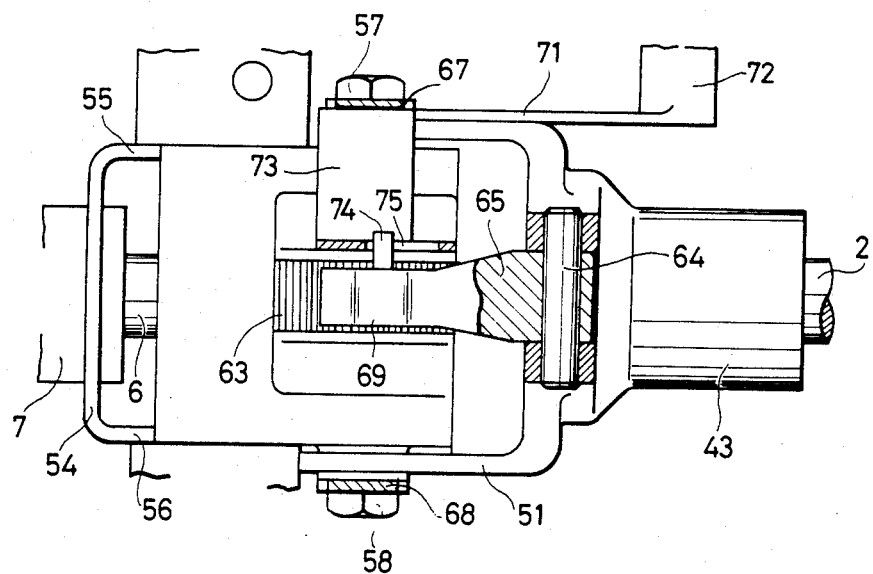
FIG. 8. is a view taken along arrow VIII of FIG. 2.

In FIG. 6 which enlargedly shows the essential portions, a bracket 48 has left and right bent portions 55 and 56 extending parallel to each other from the opposite sides of a base and connected together by a semi-cylindrical portion at the lower portion, and the bifurcated portion 51 of an upper column 43 extends so as to contact the outside of these bent portions (see FIG. 7 which is a cross-sectional view taken along line VII—VII of FIG. 6). The bifurcated portion 51 is connected to the bracket 48 by a pair of tilt pins 57 and 58 at the contact portion and is tiltable about an axis passing through two tilt fulcrums formed by the tilt pins 57 and 58.

The upper column 43 is biased in the upward tilt direction by a jumping-up spring 59 extended between the bracket 48 and the upper column 43. A stopper pin 61 is studded in the protrusion of the bifurcated portion 51 and fits in a stroke control slot 62 formed in the left bent portion 55, whereby the range of tilting of the upper column 42 is controlled. A gear portion 63 is fixed to the lower part of the semi-cylindrical portion of the bracket 48 which corresponds to the lower part of the intermediate portion between the two tilt pins 57 and 58, and a movable gear member 65 is pivotably supported on a support shaft 64 mounted between the downwardly protruding portions of the upper column 43 (see FIG. 8 which is a view taken along arrow VIII of FIG. 6).

Outside the bifurcated portion 51, a pair of support hangers 67 and 68 are supported on the tilt pins 57 and 58 and are mounted for pivotal movement about the tilt fulcrums provided by the tilt pins, and the lower ends thereof are coupled together by a roller supporting shaft 66. A roller 70 is rotatably fitted on the roller supporting shaft 66.

Between the left bent portion 55 and the hanger 67, a tilt lever 71 is supported and pivotably mounted on the tilt pin 57. The tilt lever 71 has an arm on which a knob 72 is mounted and a lower arm 73 downwardly extending and coupled to the roller supporting shaft 66. A guide hole 75 in which is fitted a guide pin 74 extending from the movable gear member 65 is formed in the lower portion of the lower arm 73, and one end of a roller pre-pressure spring 76 having the other end thereof secured to a pin studded in the downwardly protruding portion of the upper column 43 is secured to the lower portion of the lower arm 73.

The gear portion 63 is only secured to the bracket 48 side and therefore, the bracket 48 can be made small and accordingly, the lower column 7 may be made thick and the bracket 48 may be omitted, and the upper column 43 may be directly connected to the lower column 7 by the tilt pins 57 and 58.

Description will now be made of a third embodiment and a fourth embodiment which are modifications of the first and second embodiments, respectively.

Figure 9:
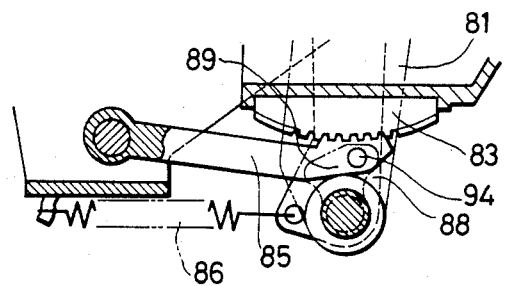
FIGS. 9 and 10 are cross-sectional side views of portions of a third embodiment and a fourth embodiment, respectively, of the present invention.

The third embodiment is shown in FIG. 9, wherein each one end of a pair of roller pre-pressure springs 86 is hooked not in the arm 83 of a tilt lever 81 but in each of a pair of support hangers 88 and the guide hole 89 for a movable gear member 85 is formed in the arm 3 while assuming a shape continuous to a hole in which the roller supporting shaft is fitted. The reason why the guide hole 89 is made into such a shape is that the lower edge of the guide hole 89 is unnecessary for the guide of a guide pin 94 and the guide of the guide pin 94 becomes smoother and more reliable.

In the other points, the construction of the third embodiment is the same as the construction of the first embodiment. Accordingly, the operation of the third embodiment is substantially the same as that of the first embodiment and therefore need not be described.

Figure 10:
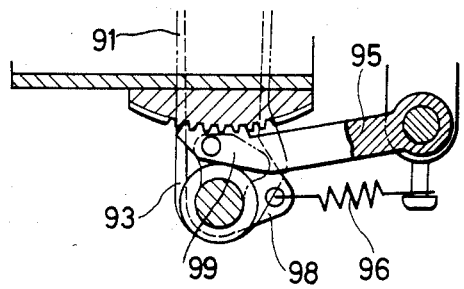

The fourth embodiment is shown in FIG. 10, wherein one end of a roller pre-pressure spring 96 is formed not in the arm 93 of a tilt lever 91 but in a support hanger 98 and the guide hole 99 for a movable gear member 95 is formed in the arm 93 while assuming a shape continuous to a hole in which the roller supporting shaft is fitted. The reason why the guide hole 99 is made into such a shape is entirely the same as the reason set forth with respect to the third embodiment.

Figure 11:
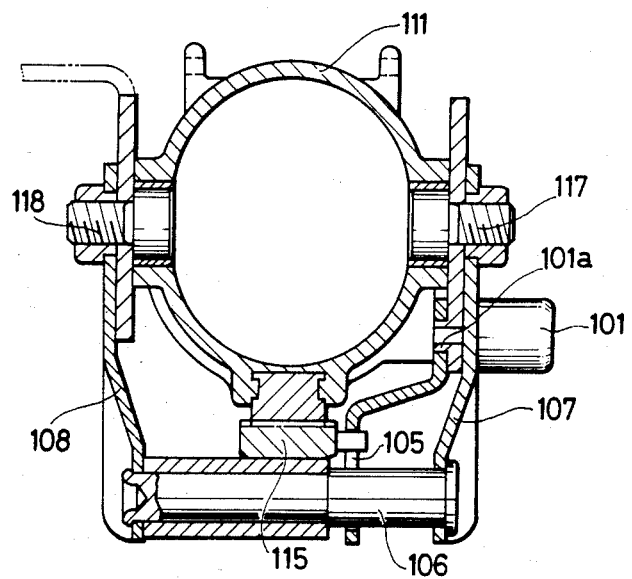
FIG. 11 is a cross-sectional view similar to FIG. 3 but showing a fifth embodiment of the present invention.

A fifth embodiment shown in FIG. 11 will now be described. The fifth embodiment is a modification of the first embodiment. In this embodiment, support hangers 107 and 108 are inwardly bent to obtain advantageous rigidity, a roller supporting shaft 106 is made shorter, the fulcrum 101a of a tilt lever 101 is shifted downwardly to lighten the lever operating force, the cylindrical portion 11 in the first embodiment is replaced by an elliptical portion 111, the shape of a guide hole 105 is similar to the shape of the guide hole in the third embodiment, and the forms of tilt pins 117, 118, a movable gear member 115, etc. are somewhat changed.

In the other points, the construction and operation of the fifth embodiment are substantially the same as those of the first embodiment.

Now, in the above-described embodiments, the movable gear member is moved from its meshing position by the engagement of the guide pin of the movable gear member with the guide hole of the arm of the tilt lever, but the same purpose can be achieved by simply biasing the movable gear member by a spring weak in the direction of non-meshing position or reversing the member in which the guide pin is studded and the member in which the guide hole is provided.

Also, in the above-described embodiments, the roller for pressing the movable gear member is made long to reinforce the support shaft, but a short roller may be used as this roller and the movement thereof may be controlled by a set ring.

In the above-described embodiments, the upper column is of a unitary structure, but the side thereof on which the tilt pin is mounted may be formed as an aluminum diecast and the upper side thereof may be formed into an iron column and the both sides may be fixed as by pressing, and further, in the above-described embodiments, the upper column portion provided with the tilt pins is made into a cylindrical shape or an elliptical shape, but alternatively, it may be made into a semicylindrical shape or a square shape. In short, the upper column portion may be made into any shape in which the fixed gear portion is provided in the intermediate portion in the direction of the tilt axis.

As described above, according to the present invention, an engagement system is adopted as the system for fixing the support portion to the fixed portion and the engaging portion is positioned at the intermediate portion between a pair of tilt pins, and this leads to the provision of a tiltable steering mechanism in which the holding force of the steering wheel is of course great and which is high in steering wheel supporting rigidity because the steering wheel load is held equally at the left and right.

What is claimed is:

1. A tiltable steering mechanism having:
a support portion for rotatably supporting a steering shaft on which a steering wheel is mounted;
a fixed portion fixed to a vehicle body and supporting said support portion tiltably about a tilt axis;
a pair of tilt fulcrum forming members defining the tilt axis;
an engaging portion provided on one of said support portions and said fixed portion and positioned at the intermediate portion between the two tilt fulcrum forming members;
a restraining member mounted on the other of said support portion and said fixed portion for movement between an engaged position and a disengaged position and engageable with said engaging portion at said engaged position to fix said support portion to said fixed portion at a selected tilt angle and disengageable from said engaging portion at a selected tilt angle and disengageable from said engaging portion at said disengaged position to render said support portion tiltable relative to said fixed portion;
holding means provided so as to be capable of assuming a holding position and a non-holding position and capable of holding said restraining member when said holding means assumes said holding position and causing said restraining member to assume said disengaged position when said holding means assumes said non-holding position; and
an operating member for causing said holding means to selectively assume said holding position and said non-holding position;
wherein said holding means has a pair of pivotable support hangers and shaft means extended between the free ends of said support hangers, said shaft means being adapted to bear against said restraining member in said holding position to thereby hold the same in said engaged position and to be disengaged from said restraining member in said non-holding position.

2. A tiltable steering mechanism according to claim 11 wherein said holding means is biased in a direction to assume said holding position.

3. A tiltable steering mechanism according to claim 1, wherein said restraining member and said holding means are operatively associated with each other so that said restraining member is guided from said engaged position to said disengaged position when said holding means comes from said holding position to said non-holding position.

4. A tiltable steering mechanism according to claim 3, wherein said restraining member has a guide pin, said holding means has a guide hole, and said pin is guided along the edge portion of said guide hole when said holding means comes from said holding position to said non-holding position, whereby said restraining member is guided from said engaged position to said disengaged position.

5. A tiltable steering mechanism according to claim 1, wherein said restraining member and said holding means are operatively associated with each other so that said restraining member is guided from said disengaged position to said engaged position when said holding means comes from said non-holding position to said holding position.

6. A tiltable steering mechanism according to claim 5, wherein said restraining member has a tapered portion, and a portion of said holding means bears against said tapered portion when said holding means comes from said non-holding position to said holding position, whereby said restraining member is guided from said disengaged position to said engaged position.

7. A tiltable steering mechanism according to claim 1, wherein gear portions are formed on said engaging portion and said restraining member, respectively, and said gear portions are capable of meshing with each other at a plurality of positions.

8. A tiltable steering mechanism according to claim 7, wherein said restraining member is a pivotable gear member.

9. A tiltable steering mechanism according to claim 1, wherein the portion of one of said support portion and said fixed portion in which said engaging portion is provided is cylindrical shaped.

10. A tiltable steering mechanism according to claim 1, wherein the portion of one of said support portion and said fixed portion in which said engaging portion is provided is elliptically shaped.

11. A tiltable steering mechanism according to claim 1, wherein said engaging portion is secured to said support portion.

12. A tiltable steering mechanism according to claim 1, wherein said engaging portion is secured to said fixed portion.

13. A tiltable steering mechanism according to claim 1, wherein said support portion is biased in an upwardly tilting direction by jumping-up biasing means.

14. A tiltable steering mechanism according to claim 1, wherein said operating member is a pivotable tilt lever having two arms, one of said arms being provided with an operating knob and the other arm being engaged with said holding means.

15. A tiltable steering mechanism according to claim 1, wherein said operating member is a pivotable tilt lever having two arms, one of said arms being provided with an operating knob and the other arm being engaged with said holding means.

16. A tiltable steering mechanism according to claim 15, wherein the centers of pivotal movement of said tilt lever and said support hanger lie on the same straight line.

17. A tiltable steering mechanism according to claim 15, wherein the center of pivotal movement of said tilt lever lies below the center of pivotal movement of said support hanger.

18. A tiltable steering mechanism according to claim 1, wherein said engaging portion is provided below the intermediate portion between said two tilt fulcrum forming members.

19. A tiltable steering mechanism according to claim 1, wherein said shaft means includes a roller supporting shaft extended between the free ends of said support hangers and a roller fitted on said support shaft.

* * * * *